UNITED STATES PATENT OFFICE.

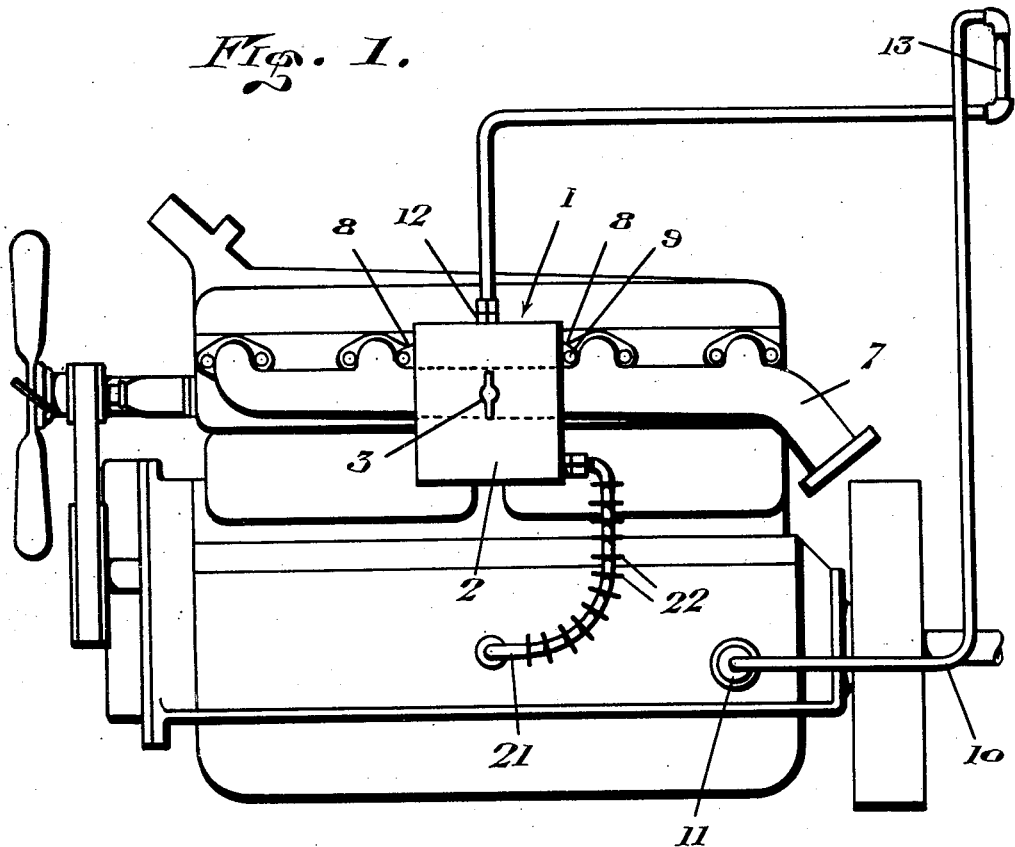
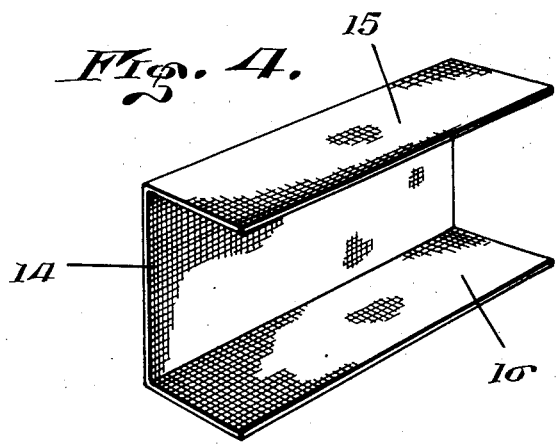

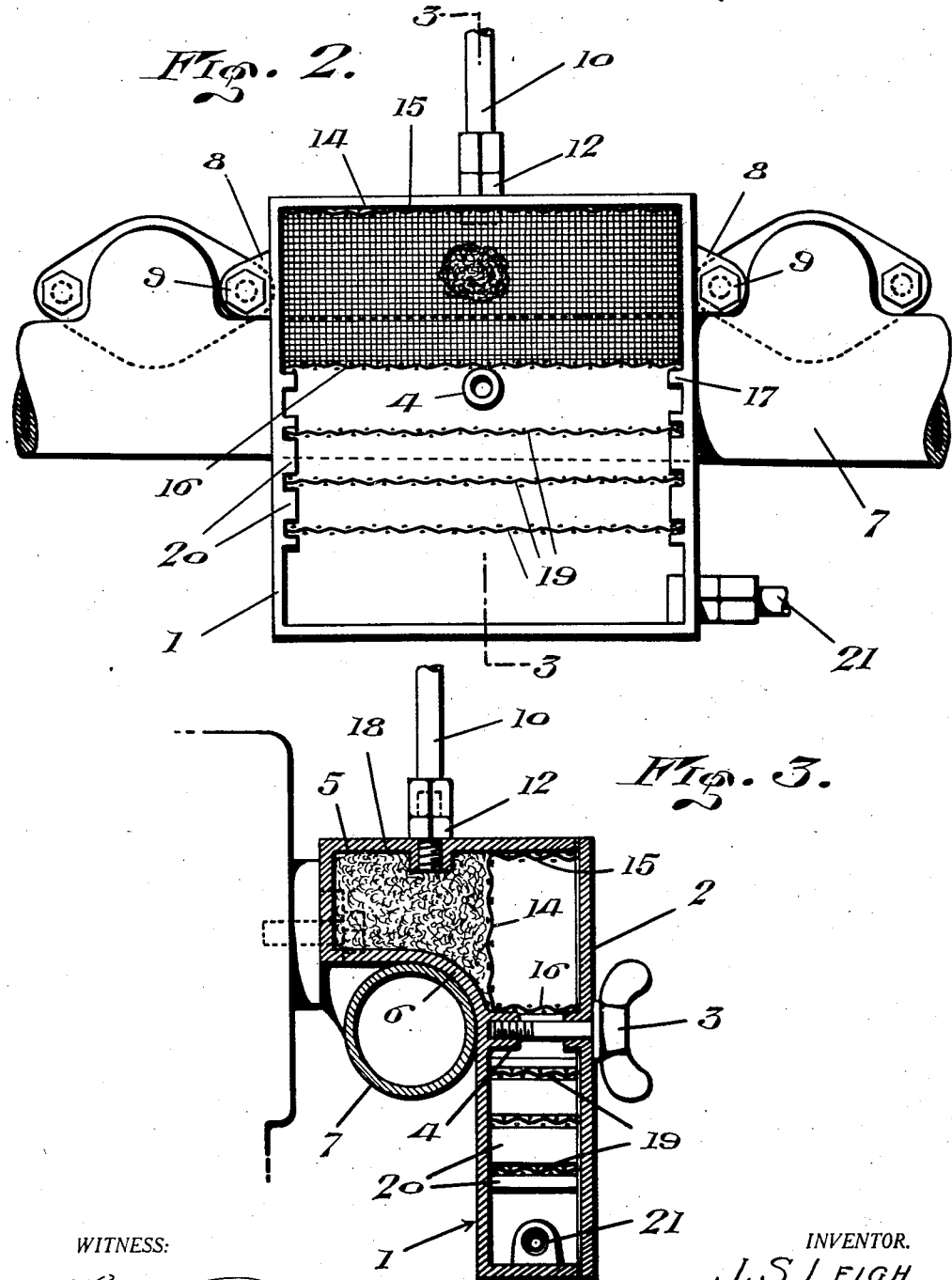

JOHN SHERMAN LEIGH, OF CINCINNATI, OHIO.

OIL-REFINER.

1,339,769.

Specification of Letters Patent.

Patented May 11, 1920.

Application filed December 17, 1919. Serial No. 345,604.

*To all whom it may concern:*

Be it known that I, JOHN S. LEIGH, a citizen of the United States, residing at Cincinnati, in the county of Hamilton and State of Ohio, have invented certain new and useful Improvements in Oil-Refiners; and I do hereby declare the following to be a full, clear, and exact description of the invention, such as will enable others skilled in the art to which it appertains to make and use the same.

This invention relates to a device for filtering and straining oil used for the lubrication of an internal combustion engine, whereby to refine the oil by removing sediment, gasolene, carbon and other foreign matter therefrom during the operation of the engine.

It is the object to provide a novel and improved device of that kind which is simple and inexpensive in construction, and which can be easily applied to various engines so that the oil is forced through the device from the oil pump to clean the oil, thereby enhancing the lubricating properties thereof and making the oil fit for longer use.

A further object is the provision of such a device of a novel form to be applied over the exhaust manifold of the engine, whereby to heat oil as it flows through the device, to distil or vaporize free gasolene that passes the pistons and to facilitate the flow of oil and the straining thereof, and a still further object is the provision of novel means within the casing for filtering and straining the oil as it passes therethrough, which means can be readily removed and renewed or replaced from time to time, in cleaning out the device.

With the foregoing and other objects in view, which will be apparent as the description proceeds, the invention resides in the construction and arrangement of parts hereinafter described and claimed, it being understood that changes can be made within the scope of what is claimed without departing from the spirit of the invention.

The invention is illustrated in the accompanying drawings, wherein:—

Figure 1 is a side elevation of the device as applied to an engine.

Fig. 2 is an enlarged elevation of the device, showing the base plate removed and a portion of the filter screen broken away.

Fig. 3 is a vertical section taken on the line 3—3 of Fig. 2, portions being shown in elevation.

Fig. 4 is a perspective view of the filtering screen.

In carrying out the invention, there is provided a vertical casing 1 having a removable face plate or front wall 2 normally held in place by means of a screw 3 extending therethrough and threaded into a boss 4 on the back of the casing, although other means can be used for removably holding said face plate in place. The upper portion of the casing 1 has a rearward extension forming a pocket 5 leading rearwardly, and the corner between said pocket and lower portion of the back of the casing is curved, as at 6, to fit over the exhaust manifold 7 of the engine, with said pocket 5 extending rearwardly over the manifold.

The casing can be secured in place by any suitable means, such as by apertured ears 8 extending therefrom to engage the bolts 9 which are used for clamping the manifold 7 in place, or such ears can be secured to the manifold or engine in any other suitable way, whereby to retain the casing in place.

The oil feed pipe or tube 10 leading from the oil pump 11 is connected to the top of the casing over the pocket 5 by means of a nipple 12 or otherwise, whereby the oil is forced from the pump into the pocket 5 from above. Said pipe 10 is preferably provided with a sight tube 13 located at the dash of the machine or other suitable point whereby the flow of oil can be observed.

The casing 1 is provided with means for filtering and straining the oil, and for this purpose, a filter screen 14 is disposed in a vertical position across the mouth of the pocket 5 and has its upper edge portion bent forwardly, as at 15, to bear against the top of the casing and abut against the face plate 2 for holding said screen back in place. Similarly, the lower edge portion 16 of the screen is bent forwardly to abut the face plate 2 and is supported by ribs 17 on the side walls of the casing, and this portion 16 also serves as a strainer for the oil as the oil passes through the screen 14, as well as holding the lower portion of the screen 14 rearwardly against the back wall at the portion 6. The pocket 5 is filled with metal wool 18 or other suitable filtering material, whereby the oil is delivered into the filtering material or filler 18, which will arrest the sediment, carbon and other foreign matter, and the oil will pass forwardly from the filtering material through the screen 14 and thence down through the strainer portion 16 of such screen, there being an open space in front of the screen 14 above the portion 16 for the flow of oil from the filtering material. Below the portion 16 are vertically spaced straining screens 19 for straining the oil as it flows downwardly, and said screens are supported by ribs or lugs 20 on the side walls of the casing, said screens 19 as well as the screen 14 and filtering material being readily removed when the face plate 2 is removed, in order that said parts can be cleaned and replaced.

An oil delivery pipe 21 is connected to one side wall adjacent to the bottom below the screens 19 for delivering the oil into the engine, and on the exterior of the crank casing the pipe is provided with a series of fins or webs 22 whereby the air will cool said pipe 21 and the oil flowing therethrough after leaving the casing 1.

During the operation of the engine, the oil is forced from the pump through the casing 1, and in passing through the filtering material and screens will be refined by the removal of sediment, carbon and other extraneous matter, and the screens 14 and 19 can be of successive finer mesh so as to retard the larger particles first and then the smaller ones in succession. Any gasolene which may pass the pistons and enter the oil sump will also be forced into the device and being heated will be distilled or vaporized, thereby removing it from the oil. The vaporized gasolene can pass out through a suitable vent or through the pipe 21 and out the crank casing vent.

Having thus described the invention, what is claimed as new is:—

1. An oil refiner comprising a casing having a pocket extending therefrom and a chamber in front of said pocket, filtering material within said pocket, said casing having an oil inlet leading to said pocket, and screens within the casing below said chamber, said casing having an oil outlet below said screens.

2. An oil refiner comprising a casing having a pocket extending therefrom, a screen disposed within the casing across the mouth of said pocket, filtering material in said pocket, straining screens within the casing below the aforesaid screen, and said casing having an oil inlet leading to said pocket and an oil outlet below said screens.

3. An oil refiner comprising a casing having an extension forming a pocket to be disposed over an exhaust manifold of an engine, filtering material in said pocket, and straining means within the casing below the mouth of the pocket, the casing having an oil inlet leading to said pocket and an oil outlet below said straining means.

4. An oil refiner comprising a vertical casing having a removable front face plate and an extension projecting rearwardly from the upper portion and forming a pocket, filtering material in said pocket, and straining screens removably supported by the walls of the casing below the mouth of said pocket, the casing having an oil inlet leading to said pocket and an oil outlet below said screens.

5. An oil refiner comprising a vertical casing having a removable front face plate and a rearwardly extending pocket at its upper end, filtering material in said pocket, a filter screen disposed across the mouth of said pocket and having upper and lower portions extending forwardly to the face plate, and straining screens removably supported by the walls of the casing and located below the aforesaid screen, said casing having an oil inlet leading to said pocket and an oil outlet below said screen.

In testimony whereof I have signed my name to this specification in the presence of two subscribing witnesses.

JOHN SHERMAN LEIGH.

Witnesses:
RAYMOND E. WETTERED,
HOWARD J. RIORDAN.